T. H. GARY.
Dumping Wagon.
No. 88,955.
Patented April 13, 1869.
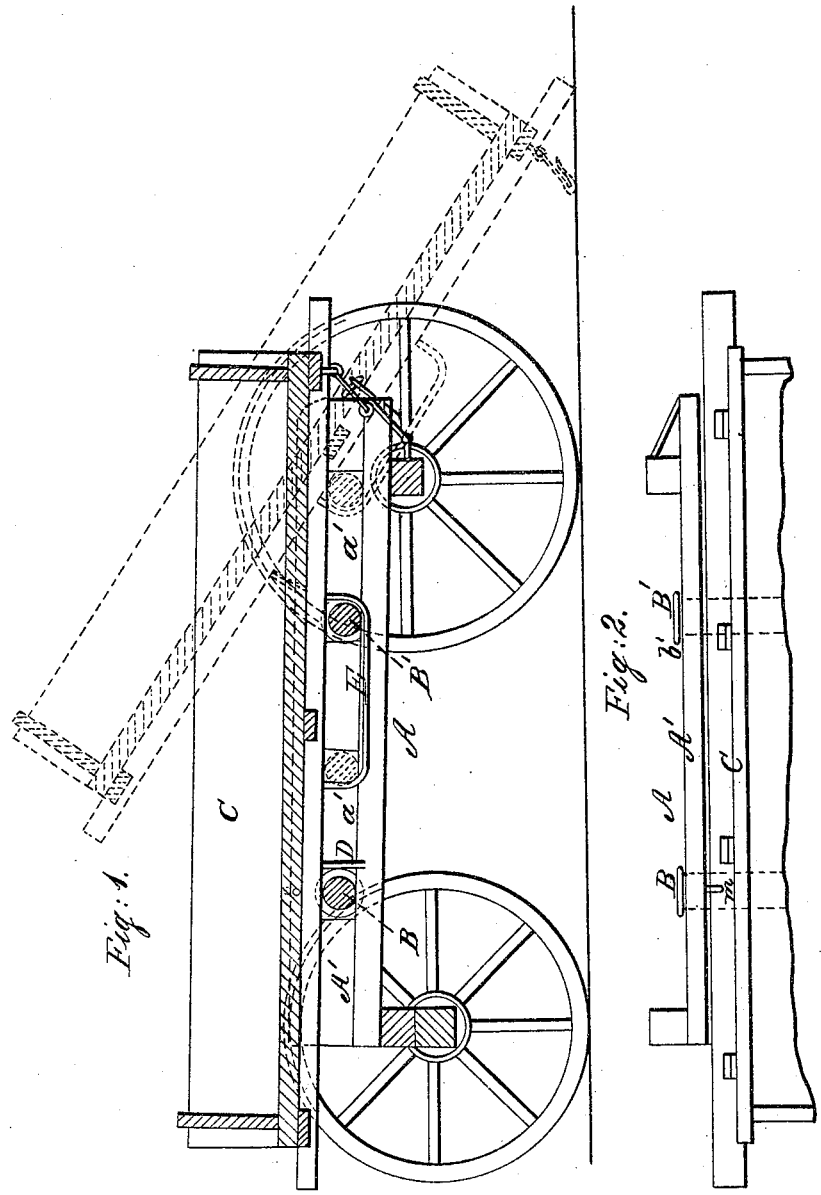

THOMAS H. GARY, OF BRISTOL, MARYLAND.

Letters Patent No. 88,955, dated April 13, 1869.

IMPROVEMENT IN DUMPING-WAGON.

The Schedule referred to in these Letters Patent and making part of the same.

*To all whom it may concern:*

Be it known that I, THOMAS H. GARY, of Bristol, in the county of Anne Arundel, and State of Maryland, have invented a new and improved Dumping-Wagon and Car; and I do hereby declare that the following is a full, clear, and exact description of the construction and operation of the same, reference being had to the accompanying drawings, making a part of this specification, in which—

Figure 1 is a longitudinal vertical section.
Figure 2 is a plan of a portion detached.

The object of this invention is to simplify and improve the device allowed to me January 22, 1869.

In the drawings—

A indicates the frame, supported by the wagon or car-wheels, and provided with slotted side-pieces A' A', to receive and accommodate the rollers B B' The latter are furnished with expanded heads, or attachable and detachable caps, or nuts $b\ b'$, to prevent them from escaping from the slots, and are so constructed and adapted to the frame A and wagon, or car-body C, that as the latter is slid back, it runs upon the rollers, and the latter travel back with it to the rear end of the slots $a'\ a'$, and when it is slid forward again the rollers run forward with it to the forward end of the slots.

D is a pin fixed to the under side of the body C, and projecting down just behind the forward roller.

E is a curved rod, both ends of which are fixed to the under side of the body C in such a manner that the rod passes under the rear roller, as seen in fig. 1.

When the body C is slid back, the rod E draws the roller B' back, as seen by the blue lines, fig. 1, and when the body is pushed forward again, the rear end of the rod carries the roller forward, as shown by the buff lines in the same figure.

At the same time when the body is slid forward, the pin D carries the roller B forward, as shown in fig. 1. The rod E and pin D thus insure the proper position of the two rollers with relation to the body C and frame A, and to each other.

The frame A may be provided with a pin, or spring-catch $m$, which, when the body C is run forward, will prevent it from being tilted. The rear roller operates as a fulcrum on which to tilt the body when it is run back.

The hook and chain I may be employed to prevent the body from running back too far, and insure its dumping properly.

The whole apparatus is simple, light, easily operated, and not liable to get out of repair. Its parts are fewer than in my former invention, which reduces its original cost and its weight, and renders it less liable to get out of order than heretofore.

Having thus described my invention,

What I claim as new, and desire to secure by Letters Patent, is—

The combination and arrangement of the frame A, having the slots $a'\ a'$, with the body C, the rollers B B', the pin D, the rod E, and the catch, or pin $m$, all constructed to operate together in the manner and for the purposes described.

To the above specification of my improvement, I have set my hand, this 2d day of February, 1869.

THOS. H. GARY.

Witnesses:
CHAS. A. PETTIT,
SOLON C. KEMON.